US 9,387,927 B2

(12) United States Patent
Rischmuller et al.

(10) Patent No.: US 9,387,927 B2
(45) Date of Patent: Jul. 12, 2016

(54) ROTARY-WING DRONE COMPRISING AUTONOMOUS MEANS FOR DETERMINING A POSITION IN AN ABSOLUTE COORDINATE SYSTEM LINKED TO THE GROUND

(71) Applicant: PARROT, Paris (FR)

(72) Inventors: Michael Rischmuller, Aix-en-Province (FR); Laure Chevalley, Paris (FR); Francois Callou, Paris (FR); Etienne Caldichoury, Paris (FR)

(73) Assignee: Parrot, Paris (FR)

( * ) Notice: Subject to any disclaimer, the term of this patent is extended or adjusted under 35 U.S.C. 154(b) by 0 days.

(21) Appl. No.: 14/323,851

(22) Filed: Jul. 3, 2014

(65) Prior Publication Data
US 2015/0149000 A1  May 28, 2015

(30) Foreign Application Priority Data

Jul. 4, 2013 (FR) ...................... 13 50054

(51) Int. Cl.
*B64C 39/02* (2006.01)
*G05D 1/10* (2006.01)

(52) U.S. Cl.
CPC .............. *B64C 39/024* (2013.01); *G05D 1/102* (2013.01); *B64C 2201/024* (2013.01); *B64C 2201/141* (2013.01)

(58) Field of Classification Search
None
See application file for complete search history.

(56) References Cited

U.S. PATENT DOCUMENTS

2011/0301784 A1* 12/2011 Oakley ................... B64C 27/04
701/2

2014/0062754 A1* 3/2014 Mohamadi ............ F41H 11/136
342/22

OTHER PUBLICATIONS

Caballero, F. et al., "Vision-Based Odometry and SLAM for Medium and High Altitude Flying UAVs", Jul. 28, 2008, Buisness Media B.V. 2008, J Intell Robot System2009, pp. 137-161.
Wang, Chaolei et al., "Monocular Vision and IMU Based Navigation for a Small Unmanned Helicopter", 2012 7th Conference on Industrial Electronics and Applications (ICIEA), pp. 1694-1699.
Carillo, Luis Rodolfo Garcia et al., "Combining Stereo Vision and Inertial Navigation System for a Quad-Rotor UAV", J. Intell Robot Syst (2012), pp. 373-387.
Weiss, Stephan M., "Vision Based Navigation for Micro Helicopters", Jan. 31, 2012, apges 1-205, XP055071841.

* cited by examiner

*Primary Examiner* — Mussa A Shaawat
*Assistant Examiner* — Kyung Kim
(74) *Attorney, Agent, or Firm* — Haverstock & Owens LLP

(57) ABSTRACT

The drone comprises: a vertical-view camera (132) pointing downward to pick up images of a scene of the ground overflown by the drone; gyrometer, magnetometer and accelerometer sensors (176); and an altimeter (174). Navigation means determine position coordinates (X, Y, Z) of the drone in an absolute coordinate system linked to the ground. These means are autonomous, operating without reception of external signals. They include image analysis means, adapted to derive a position signal from an analysis of known predetermined patterns (210), present in the scene picked up by the camera, and they implement a predictive-filter estimator (172) incorporating a representation of a dynamic model of the drone, with as an input the position signal, a horizontal speed signal, linear and rotational acceleration signals, and an altitude signal.

14 Claims, 8 Drawing Sheets

ROTARY-WING DRONE COMPRISING AUTONOMOUS MEANS FOR DETERMINING A POSITION IN AN ABSOLUTE COORDINATE SYSTEM LINKED TO THE GROUND

BACKGROUND OF THE INVENTION

The invention relates to rotary-wing drones such as quadricopters or the like.

Such drones are provided with multiple rotors driven by respective motors that can be controlled in a differentiated manner so as to pilot the drone in attitude and speed.

A typical example of such a drone is the AR.Drone of Parrot SA, Paris, France, which is a quadricopter equipped with a series of sensors (accelerometers, three-axis gyrometer, altimeter), a front camera picking up an image of the scene toward which the drone is directed, and a vertical-view camera picking up an image of the overflown ground.

The documents WO 2010/061099 A2, EP 2 364 757 A1, EP 2 431 084 A1 and EP 2 497 555 A1 (Parrot SA) describe such a drone, as well as the principle of piloting the latter through a phone or a multimedia player having a touch screen and integrated accelerometers, for example a cellular phone of the iPhone type or a player or a multimedia tablet of the iPod Touch or iPad type (registered trademarks of Apple Inc., USA).

The drone is piloted by the user by means of signals emitted by the sensor detecting the device inclinations, wherein such inclinations are replicated by the drone: for example, to make the drone move forward, the user tilts his device about the pitch axis thereof, and to move the drone aside to the right or to the left, the user tilts said device with respect to the roll axis thereof. That way, if the drone is controlled so as to tilt or "dive" downward (inclination according to a pitch angle), it will move forward with a speed that is all the more high that the inclination angle is important; conversely, if it is controlled so as to "nose up" in the opposite direction, its speed will progressively slow down, then will invert, going back rearward. In the same way, for a control of inclination about a roll axis, the drone will lean to the right or to the left, causing a linear displacement in horizontal translation to the right or to the left.

The user has at his disposal other commands, which are displayed on the touch screen, in particular "climb/descent" (throttle control) and "right rotation/left rotation" (rotation of the drone about its yaw axis).

The invention more particularly relates to a navigation system allowing to know the position of the drone in an absolute coordinate system (Galilean) linked to the ground, for example a geographic terrestrial coordinate system. The position of the drone at a given instant is expressed by two horizontal position coordinates with respect to a known ground origin, and an altitude coordinate with respect to the ground level (supposed to be horizontal).

The GPS satellite-based global positioning systems are well-known navigation systems allowing to deliver such 3D position coordinates, with a very high accuracy.

The GPS technique, based on the reception of signals emitted by several satellites, are however inoperative in a closed environment, inside a building, due to the impossibility to suitably pick up these signals.

The problem of the invention is to allow the drone to localize itself with the desired measurement accuracy in such an environment where it is not possible to receive GPS signals, so as to be able to perform a flight in full autonomy, i.e. without communication with the outside to obtain position information.

This latter constraint eliminates in particular the localization systems of the motion capture type, where a set of cameras follows the position of the drone to be localized and determines by calculation, based on the picked-up images, an estimated position that is sent to the drone through a radio link. This system requires heavy technical means (cameras, calculation means) as well as a wireless link with the drone for the sending of information to the latter from the calculator. Hence, it is not an autonomous navigation system.

The object of the invention is to allow the drone to localize itself, without communication with the outside, based on the only signals delivered by a series of simple pre-existing sensors, in particular a low-resolution vertical camera. And this:
  with a high accuracy, typically a centimeter accuracy;
  without drift, which excludes a simple integration of the accelerometer signals produced by the inertial unit;
  giving a position in an absolution coordinate system, independent of the drone: in particular, when several drones progress together in a same space, it is essential that this coordinate system is common to all the drones;
  providing directly the position of the drone in the coordinate system, without requiring a previous calibration;
  with a high refresh rate, typically of the order of 30 Hz;
  robustly, without risk of perturbation by false detections, inconsistent values and various artefacts, or by signals coming from other drones progressing simultaneously close to each other.

The thus-obtained absolute position information will be able to be used for various purpose, in particular for a control in position of the drone with compensation for the sensor-drift phenomena, the effects of wind or the displacements of the mass of air in which the drone progresses, etc., and any other information liable, in particular, to distort the indications coming from the inertial unit.

SUMMARY OF THE INVENTION

The invention proposes for that purpose a rotary-wing drone with multiple rotors driven by respective motors selectively controlled by application of differentiated motor commands to pilot the drone in altitude and speed. This drone comprises a plurality of sensors adapted to deliver respective drone-state signals, and an predictive-filter estimator incorporating a representation of a dynamic model of the drone, this filter being adapted to perform a prediction of at least one state value of the drone based on the motor commands and to periodically readjust this prediction as a function of the signals delivered by the sensors. The sensors comprise: a vertical-view camera, pointing downward, adapted to pick up images of a scene of the ground overflown by the drone and to produce a horizontal speed signal, derived from an analysis of the displacement of the picked-up scene from one image to the following; gyrometer, magnetometer and accelerometer sensors, adapted to deliver linear and rotational acceleration signals; and an altimeter, adapted to deliver a signal of drone altitude relative to the overflown ground.

Characteristically of the invention, the drone further includes navigation means, adapted to determine position coordinates of the drone in an absolute coordinate system linked to the ground. These navigation means are autonomous means adapted to operate without reception of signals external to the drone, they comprise image analysis means, adapted to derive a position signal from an analysis of known predetermined patterns, present in the scene picked up by the camera. Besides, they implement the predictive-filter estimator at the input of which are applied the position signal, the horizontal speed signal, the linear and rotational acceleration signals, and the altitude signal.

The predictive filter may in particular be an eight-state filter, these states comprising: two horizontal components of the speed of displacement of the drone relative to the ground, expressed in a coordinate system linked to the drone; two horizontal components of the speed of air relative to the ground, expressed in the absolute coordinate system linked to the ground; two horizontal components of the drone accelerometer bias; and two horizontal coordinates of the drone position in the absolute coordinate system linked to the ground. The predictive filter is preferably a Kalman predictive filter.

Advantageously, the altimeter also comprises a predictive filter adapted to perform a prediction of the drone altitude and to periodically readjust this prediction as a function the signals delivered by at least one between a telemeter sensor and a barometer sensor, and a signal of vertical coordinate of the drone position, derived from the analysis of the known predetermined patterns present in the scene picked up by the camera.

The means for analyzing the known predetermined patterns present in the scene picked up by the camera may in particular include: pre-filtering means, adapted to extract from the image delivered by the camera the pixels corresponding to the edges of the patterns and sub-patterns, and to deliver the position thereof and the orientation of the contour of each pattern and sub-pattern; colorimetric means, adapted to determine the proper color of each sub-pattern; recognition means, adapted to identify each pattern based on the proper colors of each of the its sub-patterns; and position determination means, adapted to determine the position coordinates of the drone in the absolute coordinate system linked to the ground as a function of the patterns identified by the recognition means.

The position determination means can be means adapted to evaluate a distance between the drone and a pattern, either as a function i) of the size of the pattern in the image picked up by the camera, ii) of the known real size of the pattern and iii) of the geometric characteristics of the optical system of the camera, or by i) determining for each pattern a straight line linking each pattern to the drone and ii) determining the position by applying to these straight lines a least-square minimization algorithm.

The invention also relates to a unit comprising a drone as described above, and a carpet carrying an array of said predetermined patterns, each of these patterns being uniquely identified by proper visual characteristics. The proper visual characteristics may notably comprise for each of the patterns a plurality of colored sub-patterns, the color of each sub-pattern being chosen in a predetermined series of colors, and the colors of the sub-patterns of a same pattern being uniquely chosen, and invariant by rotation, for all the patterns of the carpet.

BRIEF DESCRIPTION OF THE DRAWINGS

An exemplary embodiment of the device of the invention will now be described, in relation with the appended drawings in which the same numerical references denote identical or functionally similar elements through the figures.

DETAILED DESCRIPTION OF THE PREFERRED EMBODIMENTS

Figure 1:
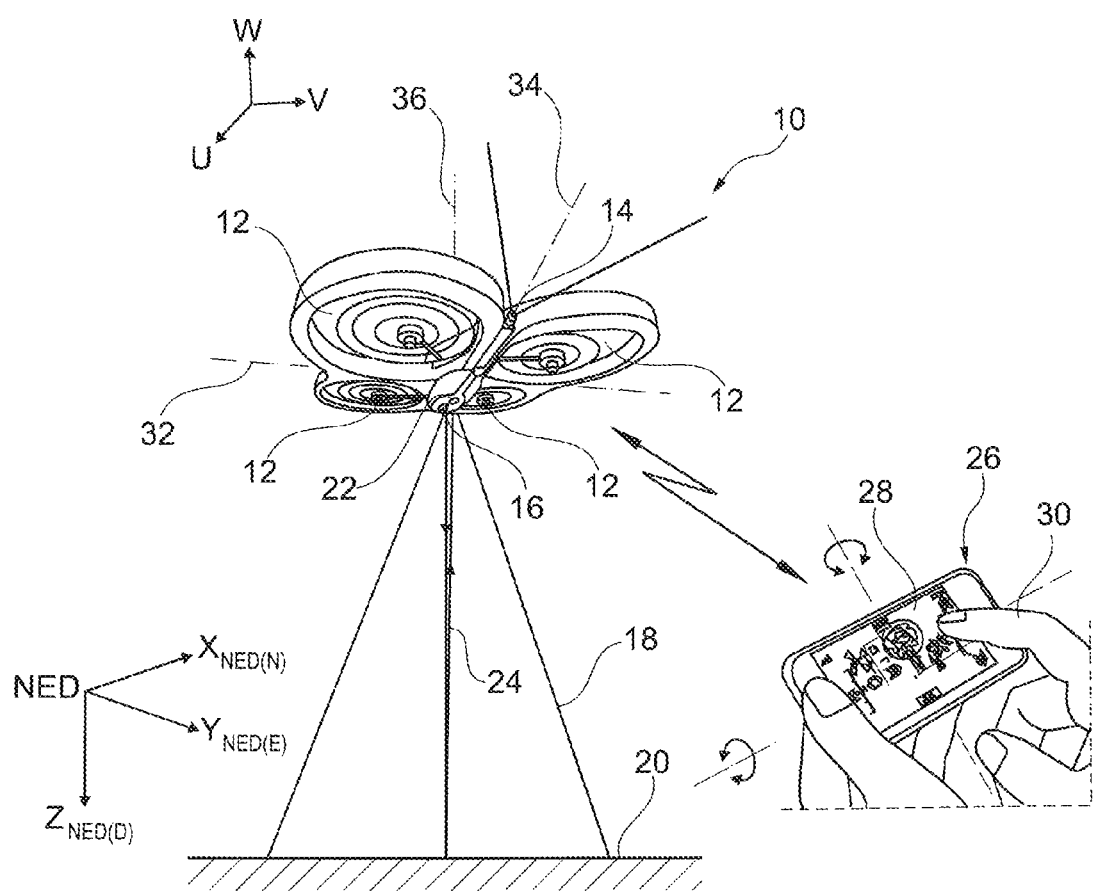
FIG. 1 is an overall view showing the drone and the associated remote-control device for the remote piloting thereof.

In FIG. 1, the reference 10 generally denotes a drone, for example a quadricopter such as the above-mentioned AR.Drone described in the WO 2010/061099 A2 and EP 2 364 757 A1, as well as the FR 2 915 569 A1 (which describes in particular the system of gyrometers and accelerometers used by the drone), EP 2 431 084 A1 et EP 2 497 555 A1 (which describe in particular how to control predetermined trajectories).

The drone 10 includes four coplanar rotors 12, whose motors are controlled independently by an integrated navigation and attitude control system. A first front-view camera 14 is provided, which allows to obtain an image of the scene toward which is oriented the drone, for example a CMOS-sensor wide-angle camera. The drone also includes a second, vertical-view camera 16, pointing downward (beam 18), adapted to pick up successive images of the overflown ground 20 and used in particular to evaluate the speed of the drone relative to the ground.

Inertial sensors (accelerometers and gyrometers) allow to measure with a certain accuracy the angular speeds and the attitude angles of the drone, i.e. the Euler angles describing the drone inclination. Generally, by "inclination", it will be meant the inclination of the drone with respect to a horizontal plane of a fixed terrestrial system, it being understood that the two longitudinal and transverse components of the horizontal speed are intimately linked to the inclination according to the two respective pitch and roll axes of the drone.

Two coordinate systems may be considered in the following, according to the case:
 a local coordinate system $\{u,v,w\}$ linked to the body of the drone: the drone, although being strongly symmetrical by construction, includes a front and a rear, and the position of the camera will be considered as pointing frontward, hence defining the axis u. The axis v is perpendicular to u in the mid-plane of the drone, and the axis w is the vertical axis directed toward the ground;

an absolute coordinate system of the NED (North East Down) type, which is a fixed terrestrial coordinate system, in particular a geographic coordinate system $\{X_{NED}, Y_{NED}, Z_{NED}\}$: the axis $X_{NED}$ corresponds for example to the direction of the magnetic North, the direction $Y_{NED}$ is the direction parallel to the plane of the ground perpendicular to the geographic North (i.e. the geographic East), and the direction $Z_{NED}$ is perpendicular to the plane of the ground and oriented downward.

An ultrasonic telemeter 22 arranged under the drone (beam 24) and an on-board barometer sensor moreover provide measurements that, when combined, give an estimation of the drone altitude with respect to the ground 20.

As regards the linear speed of translation of the drone in a horizontal plane with respect to the ground, this speed is evaluated by analysis of the image provided by the vertical-view camera of the drone in combination with the accelerometer data, thanks to a software that estimates the displacement of the scene picked up by the camera from one image to the following, and applies to this estimated displacement a scale factor that is function of the measured altitude. This technique is described in detail in the EP 2 400 460 A1 (Parrot SA), to which reference may be made for more details.

The drone 10 is piloted by a remote-control device 26 provided with a touch screen 28 displaying the image taken on-board by the front camera 14, with in superimposition a number of symbols allowing the activation of piloting commands by simple contact of a user's finger 30 on the touch screen 28. The device 26 is provided with means for radio link with the drone for the bidirectional exchange of date from the drone 10 to the device 26, in particular for the transmission of the image picked up by the camera 14, and from the device 26 to the drone 10 for the sending of piloting commands. This link may be, for example, of the Wi-Fi (IEEE 802.11) or Bluetooth local network type (which are registered trademarks). The device 26 is also provided with inclination sensors allowing to control the attitude of the drone by imparting corresponding inclinations to the device.

As indicated in introduction, the remote-control device 26 is advantageously consisted by a phone or a multimedia player having a touch screen and an integrated accelerometer, for example a cellular phone of the iPhone type, a player of the iPod Touch type or a multimedia tablet of the iPad type, which are devices incorporating the various organs of control required for the display and detection of the piloting commands, the visualization of the image picked up by the front camera, and the bidirectional data exchange with the drone by Wi-Fi or Bluetooth link.

The piloting of the drone 10 consists in making the latter progress by controlling the motors in a differentiated manner to generate, according to the case, movements of:
a) rotation about a pitch axis 32, to make the drone move forward or reward; and/or
b) rotation about a roll axis 34, to move the drone aside to the right or to the left; and/or
c) rotation about a yaw axis 36, to make the main axis of the drone rotate to the right or to the left; and/or
d) translation downward or upward by changing the gas regime, so as to reduce or increase, respectively, the altitude of the drone.

Reference may be made to the above-mentioned WO 2010/061099 A2 and EP 2 364 757 A1 for more details about these aspects of the system.

The drone has also an automatic and autonomous system of stationary flight stabilization (auto-piloted "fixed-point" configuration), activated in particular as soon as the user removes his finger from the touch screen of the device, or automatically at the end of the lift-off phase, or also in case of interruption of the radio link between the device and the drone. The drone then switches to a lift condition in which it will be automatically immobilized and stabilized, without any intervention of the user.

Control and Servo-Control of the Drone Motors

Figure 2:
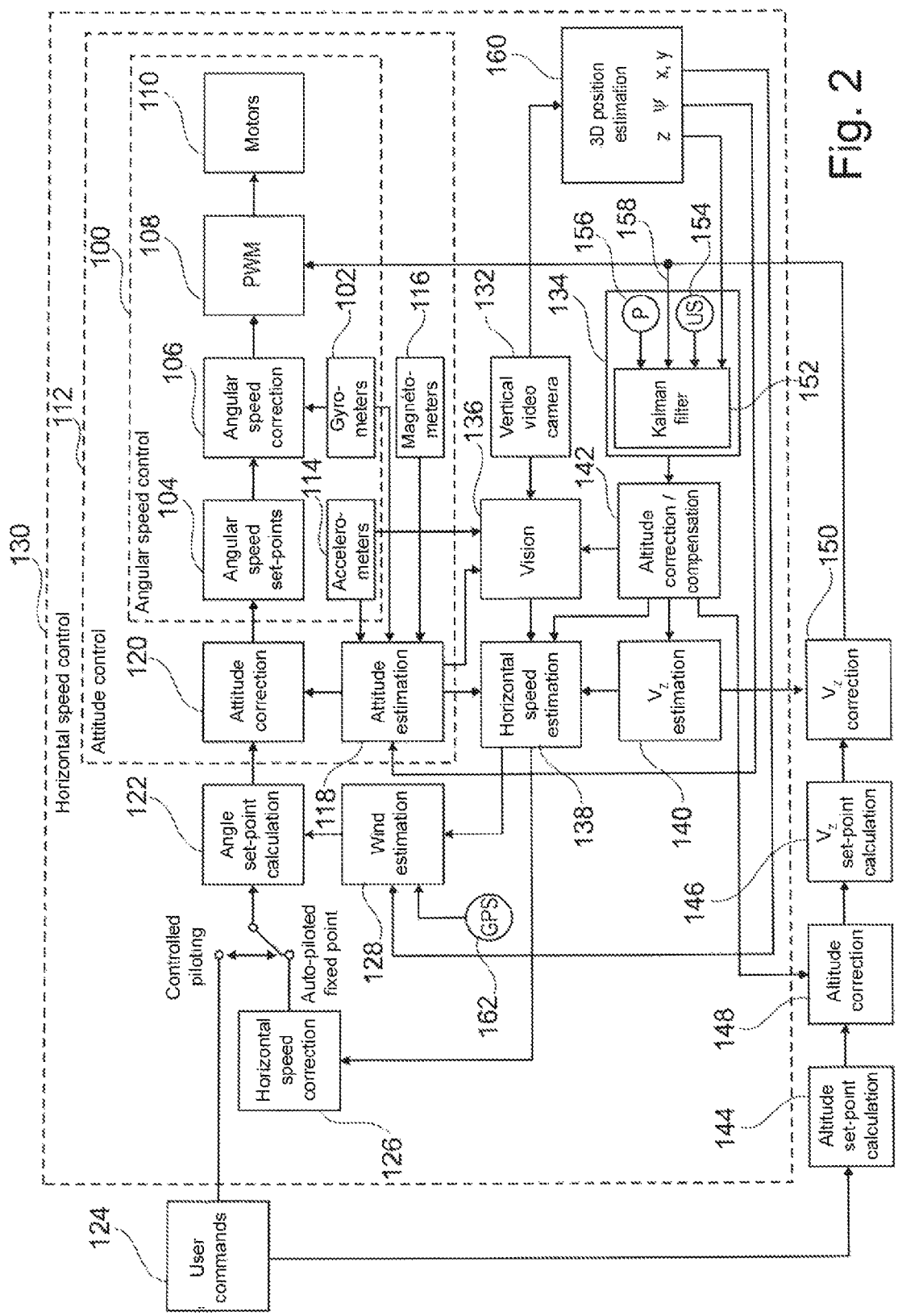
FIG. 2 is a block diagram of the different organs of control, servo-control and assisted piloting of the drone.

The way the piloting set-points for the motors of the drone are defined will now be exposed, with reference to FIG. 2, which is a functional-block diagram of the various organs of control and servo-control of the drone.

It will be noted that, although these diagrams are presented as interconnected circuits, the various functions are essentially software-implemented, this representation being only illustrative.

Generally, as illustrated in FIG. 2, the piloting system involves several imbricated loops for the control of the horizontal speed, the angular speed and the attitude of the drone, in addition to the altitude variations.

The most central loop, which is the angular speed control loop 100, uses on the one hand the signals provided by gyrometers 102, and on the other hand, a reference consisted by angular speed set-points 104. These various pieces of information are applied at the input of an angular speed correction stage 106, which itself pilots a control stage 108 for controlling the motors 110 so as to regulate separately the regime of the various motors to correct the angular speed of the drone by the combined action of the rotors driven by these motors.

The angular speed control loop 100 is imbricated in an attitude control loop 112, which operates based on the indications provided by the gyrometers 120, by accelerometers 114 and by a magnetometer 116 giving the absolute orientation of the drone in a terrestrial geomagnetic system. The data delivered by these various sensors are applied to an attitude estimation stage 118 of the PI (Proportional-Integrator) type. The stage 118 produces an estimation of the real attitude of the drone, applied to an attitude correction stage 120 that compares the real attitude to angle set-points generated by a circuit 122 based on commands directly applied by the user 124 ("controlled piloting" configuration) and/or data generated internally by the automatic pilot of the drone, via a horizontal speed correction circuit 126, to keep the drone in a standstill position (auto-piloted "fixed-position" configuration). The possibly corrected set-points applied to the circuit 120 and compared with the real attitude of the drone are transmitted by the circuit 120 to the circuit 104 to suitably control the motors.

To sum up, based on the error between the set-point (applied by the user and/or generated internally) and the angle measurement (given by the attitude estimation circuit 118), the attitude control loop 112 calculates an angular speed set-point using the PI corrector of the circuit 120. The angular speed control loop 110 then calculates the difference between the preceding angular speed set-point and the angular speed effectively measured by the gyrometers 102. The loop calculates, based on this information, the various set-points for the rotational speed (and thus for the ascensional force), which are sent to the motors 110 to execute the manoeuver demanded by the user and/or planed by the automatic pilot of the drone.

The angle-set-point calculation circuit 122 also receives corrections delivered by a wind estimation and compensation circuit 128, described in particular in the French patent FR 12 52895, of 30.03.2012, entitled "Procédé pilotage d'un drone à voilure tournante àrotors multiples avec estimation et compensation du vent latéral".

The horizontal speed control loop 130 uses the vertical video camera 132 (denoted 16 in FIG. 1) and an altitude estimator circuit 134 (with an ultrasonic telemeter 154 combined with a barometer sensor 156). A circuit 136 processes the images produced by the vertical camera 132, in combination with the signals of the accelerometer 114 and of the attitude estimation circuit 118, to estimate by means of a circuit 138 the components of the horizontal speed according to the two pitch and roll angles of the drone. The estimated horizontal speeds are corrected by the vertical speed estimation given by a circuit 140 and by an estimation of the altitude given by the circuit 142 based on the information of the sensors 134.

To make the drone move upward or downward, the user 124 applies commands to an altitude set-point calculation circuit 144, such set-points being applied to a circuit 146 for calculating the ascensional speed set-point $V_z$ via the altitude correction circuit 148 receiving the altitude estimation given by the circuit 142. The calculated ascensional speed $V_z$ is applied to a circuit 150 that compares this set-point speed to the corresponding speed estimated by the circuit 140 and modified accordingly the motor command data (circuit 108) so as to increase or decrease the rotational speed of all the motors simultaneously, in order to minimize the difference between the set-point ascensional speed and the measured ascensional speed.

As regards more particularly the altitude estimation circuit 134, the latter implements a state estimator 152 of the "Kalman filter" type, which is an infinite pulse response filter that estimates the states of a dynamic system (the drone in the present case) based on a series of measurements applied at the input, with:
the signal delivered by the ultrasonic sensor 154 (denoted 22 in FIG. 1),
the signal delivered by the barometer sensor 156, and
at 158, the ascensional speed set-point $V_z$ (hereinafter "PWM set-point") produced by the vertical speed correction circuit 150 and applied to the motor of the drone (circuit 108): the PWM set-point represents the vertical thrust force resulting from the simultaneous control of the four motors of the drone.

This technique is described in particular in the French application FR 12 52888, of 30 Mar. 2012, entitled "Estimateur d'altitude pour drone a voilure tournante àrotors multiple".

The dynamic system of the Kalman filter is consisted by a set of equations that describes the behavior of the drone (this modelling will be exposed in detail hereafter). The Kalman filter 152 operates in two phases, with successively:
a prediction phase, performed at each iteration of the filter: this phase consists in predicting the altitude of the drone at the current time by means, on the one hand, of the PWM set-point, and on the other hand, of the dynamic modelling of the drone;
a readjustment phase, which consists in correcting the prediction using the current measurements delivered by the ultrasonic sensor 154 and barometer sensor 156. This step is not necessarily performed at each iteration because, as will be seen hereinafter, the measurements of the ultrasonic sensor are not necessarily always available.

The Kalman filter uses and estimates four states, i.e.:
the altitude of the drone with respect to its starting point (position at the time of lift-off),
the vertical speed $V_z$,
the bias of the PWM set-point, and
the bias of the pressure measurement delivered by the barometer sensor 156.

The state corresponding to the bias of the PWM set-point represents the error of the drone thrust model: the thrust model may indeed vary as a function of different parameters such as the weight of the drone, the aerodynamic efficiency of the propellers (which itself depends on the state of the propellers and on the pressure of air), etc. It serves to readjust the model during flight using the measurements provided by the two sensors, which permits in particular to be more precise when these measurements disappear. The bias state of the pressure measurement permits to correct the barometer sensor drifts, which are liable to appear at the lift-off, at the start of the motors and during the first seconds of flight with the rising in temperature, or also when the pressure environment is modified in other circumstances, for example when the drone progresses inside a room and a person opens a window of this room, etc.

Characteristically of the invention, it is further provided a circuit 160 for estimating the position of the drone in an absolute coordinate system linked to the ground, circuit whose operation will be described with reference to FIG. 3.

Finally, the drone may, if need be, be provided with a GPS receiver 162 allowing, if it is possible to sense the signals emitted by the satellites, to produce another information of absolute position, allowing in particular to correct the effects of wind and the displacements of the mass of air in which the drone progresses, by application of an additional input to the wind estimator 128. This GPS data may be used as an input for the predictive filter as a complement but also in replacement of the data coming from the recognition of the known predetermined patterns, present and recognizable in the scene picked up by the vertical camera 132 (these patterns and the way to detect them are described in more detail hereinafter with reference to FIG. 4 and following).

It will however be noted that the first object of the invention is to obtain the estimation of the absolute position of the drone without using such a GPS receiver, and that the latter is provided only subsidiarily and is not in any way necessary to the implementation of the invention.

Elaboration of the Drone Attitude Control Set-Points

The way the drone control set-points are elaborated by means of the above-described circuits will now be exposed. Let's call:
u the component of the horizontal translation speed in the direction of the main axis of the drone (along the roll axis 34);
v the component of the horizontal translation speed in the transverse direction along the pitch axis 32); and
w the vertical translation speed,
the whole in the coordinate system {u,v,w} linked to the drone, independent of the inclination of the latter with respect to the reference coordinate system NED.

Each of the four propellers i of the drone (i=1 ... 4) exerts a couple $\Gamma_i$ and an ascensional thrust force $F_i$ proportional to the square of the rotational speed $\omega_i$ of the motor:

$$\begin{cases} F_i = a\omega_i^2 \\ \Gamma_i = b\omega_i^2 \end{cases}$$

The fundamental relation of dynamics is applied, which gives as a projection on the axes of the mobile reference system of the drone the three following equations:

$$\dot{u} = (rv - qw) - g\sin\theta - Cxu$$

$$\dot{v} = (pw - ru) + g\sin\varphi\cos\theta + Cyv$$

$$\dot{w} = (qu - pv) + g\cos\varphi\cos\theta - \frac{1}{m}\sum_{i=1}^{4} a\omega_i^2$$

(Equations 1-3)

p, q and r being the angular speeds according to the three axes, g being the acceleration of the gravity, $\phi$ and $\theta$ being the two angles defining the inclination of the drone with respect to the horizontal (Euler angles: if $\psi$ corresponds to a rotation about the axis $Z_{NED}$ of the absolute coordinate system NED, $\theta$ corresponds to a rotation about the axis $Y_{NED}$ rotated by $\psi$, and $\phi$ corresponds to a rotation about the axis u), $C_x$ and $C_y$ being the drag coefficients (reflecting the friction forces undergone by the drone) in the two horizontal axes, a being a coefficient linking the thrust and the ascensional speed to the rotational speed $\omega$, and m being the mass of the done.

The kinetic moment theorem is likewise applied to the system, still in projection in the mobile reference system, which leads to the three following equations:

$$I_x\dot{p}+qr(I_z-I_y)=la(\omega_2^2-\omega_4^2)$$

$$I_y\dot{q}+pr(I_x-I_z)=la(\omega_1^2-\omega_3^2)$$

$$I_z\dot{r}+pq(I_y-I_x)=b(\omega_1^2-\omega_2^2+\omega_3^2-\omega_4^2)$$

(Equations 4-6)

$I_x$, $I_y$ and $I_z$ being parameters representative of the coefficient of inertia of the drone along the three axes, and l being the distance separating the motor from its center of gravity.

In these equations, the first term of the left member corresponds to the dynamic moment of the system, the second term represents the contribution of the Coriolis forces to the dynamic moment, and the right member corresponds to the moments exerted by the ascensional forces $F_i$ and the couples $\Gamma_i$ created by the propellers of each of the rotors.

Finally, the following relation is demonstrated, using the three Euler angles $\phi$, $\theta$ and $\Psi$:

$$\dot{\varphi} = p + (q\sin\varphi + r\cos\varphi)\tan\theta$$

$$\dot{\theta} = q\cos\varphi - r\sin\varphi$$

$$\dot{\psi} = \frac{q\sin\varphi + r\cos\varphi}{\cos\theta}$$

(Equations 7-9)

The behavior of the system is hence described in total by nine equations with nine unknowns.

In the vicinity of the equilibrium point, with the drone in lift condition at the horizontal (zero speed and inclination):

$$u=v=w=\theta=\phi=0$$

The Equations 1-9 become:

$$g = \frac{1}{m}\sum_{1}^{4} a\omega_i^2, \; p = q = r = 0, \; \omega_1 = \omega_3, \; \omega_2 = \omega_4, \; \omega_1 = \omega_2$$

And thus, near the equilibrium point:

$$\omega_1 = \omega_2 = \omega_3 = \omega_4 = \frac{1}{2}\sqrt{\frac{mg}{a}} = \omega_0$$

Let's put $w_i = \omega_1 - \omega_0$, with i=1 . . . 4, and apply a first-order linearization to the previous equations about the equilibrium point, the following system of linearized equations is obtained:

$$\begin{cases} \dot{u} = -g(\theta) - Cx*u \\ \dot{v} = g(\varphi) + Cy*v \\ \dot{w} = -\frac{2a\omega_0}{m}(w_1 + w_2 + w_3 + w_4) \\ \dot{p} = \frac{la\omega_0}{I_x}(w_2 - w_4) \\ \dot{q} = \frac{la\omega_0}{I_y}(w_1 - w_3) \\ \dot{r} = \frac{b\omega_0}{I_z}(w_1 + w_3 - w_2 - w_4) \\ \dot{\varphi} = p \\ \dot{\theta} = q \\ \dot{\psi} = r \end{cases}$$

(Equations 10-18)

Estimation of the Drone Position in the Horizontal Plane

The invention proposes a technique of position estimation based on a modelling of the dynamic behavior of the drone in flight.

This dynamic model, the equations of which will be given hereinafter, will be used with a state estimator of the "Kalman filter" type, which is an infinite pulse response filter that estimates the states of a dynamic system (the drone in the present case) based on a series of measurements applied at the input. The general principles of this technique will be found, for example, in R. E. Kalman, *A new Approach to Linear Filtering and Prediction Problems*, Transactions of the ASME—*Journal of Basic Engineering*, Vol. 82 (1960).

Figure 4:
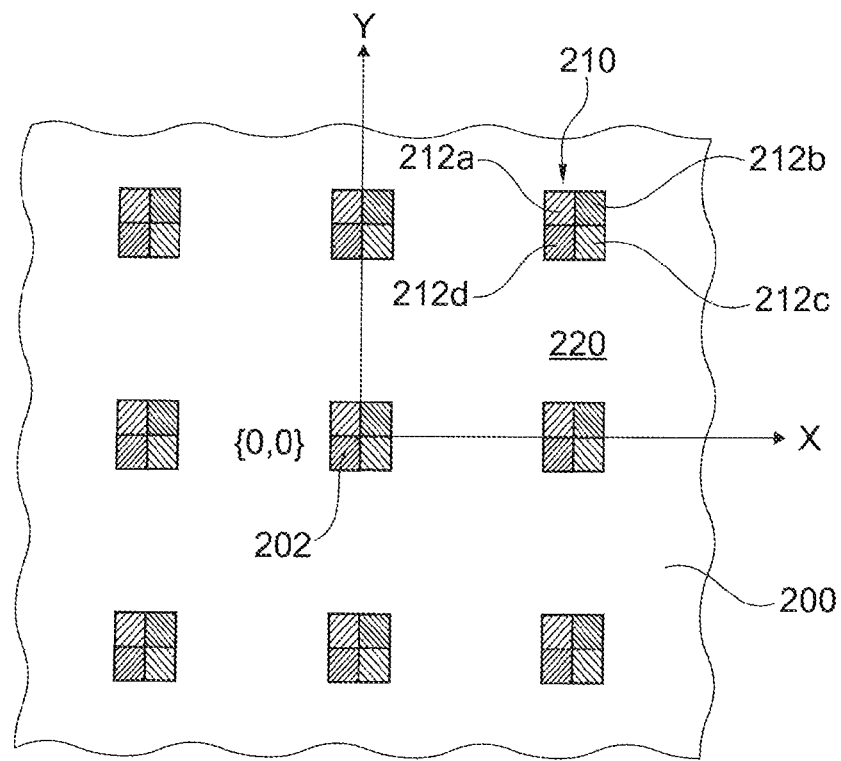
FIG. 4 is a top view of the carpet used by the method of the invention, with a number of patterns placed thereon.

In the present case, the Kalman filter will use and estimate eight states, i.e.

the horizontal components $V_{D/S_X}$ and $V_{D/S_Y}$ of the speed of displacement of the drone relative to the ground (DAS), expressed in the local coordinate system {u,v,w} linked to the body of the drone, the horizontal components $V_{A/S_X}$ and $V_{A/S_Y}$ of the speed of air relative to the ground (A/S), expressed in the fixed absolute terrestrial coordinate system NED, the biases $B_X$ and $B_Y$ of the accelerometer along its axes X and Y, and the horizontal coordinates $X_{NED}$ and $Y_{NED}$ of the drone in the absolute coordinate system NED, determined by analysis of the patterns of a carpet 200 laid on the ground (these patterns and how to analyze them will be described in more detail hereinafter with reference to FIG. 4 and following).

The vertical coordinate $Z_{NED}$ corresponds to the altitude of the drone above the ground, determined by the altitude estimator 134.

The state vector of the Kalman filter is hence written:

$$X = \begin{pmatrix} V_{D/S_X} \\ V_{D/S_Y} \\ V_{A/S_X} \\ V_{A/S_Y} \\ B_X \\ B_y \\ X_{NED} \\ Y_{NED} \end{pmatrix}$$

The evolution of the eight states of the estimator of the Kalman filter may be predicted by means of the dynamic model describing the behavior of the drone. The measured values of the speed relative to the ground and of the acceleration of the drone will serve to readjust the predictions given by this estimator, hence allowing i) to improve the accuracy of estimation of the quantities directly measured (filtering function of the estimator), as the speeds $V_{D/S_X}$ and $V_{D/S_Y}$ of displacement of the drone relative to the ground, and ii) to estimate the quantities that are not available to a direct measurement (function of state estimator), as the speed and direction of wind corresponding to the components $V_{A/S_X}$ and $V_{A/S_Y}$.

In continuous time, the state equations of the system (dynamic model of the drone in flight) are written:

$$\dot{X} = A*X + B*U$$

$$Y = C*X + D*U$$

with:

$$A = \begin{pmatrix} \begin{pmatrix} -\frac{C_x}{m} & \omega_Z \\ -\omega_Z & -\frac{C_y}{m} \end{pmatrix} & \begin{pmatrix} \frac{C_x}{m} & 0 \\ 0 & \frac{C_y}{m} \end{pmatrix} R_\psi & \begin{pmatrix} 0 & 0 \\ 0 & 0 \end{pmatrix} & \begin{pmatrix} 0 & 0 \\ 0 & 0 \end{pmatrix} \\ \begin{pmatrix} 0 & 0 \\ 0 & 0 \end{pmatrix} & \begin{pmatrix} 0 & 0 \\ 0 & 0 \end{pmatrix} & \begin{pmatrix} 0 & 0 \\ 0 & 0 \end{pmatrix} & \begin{pmatrix} 0 & 0 \\ 0 & 0 \end{pmatrix} \\ \begin{pmatrix} 0 & 0 \\ 0 & 0 \end{pmatrix} & \begin{pmatrix} 0 & 0 \\ 0 & 0 \end{pmatrix} & \begin{pmatrix} 0 & 0 \\ 0 & 0 \end{pmatrix} & \begin{pmatrix} 0 & 0 \\ 0 & 0 \end{pmatrix} \\ \begin{pmatrix} 0 & 0 \\ 0 & 0 \end{pmatrix} & \begin{pmatrix} 0 & 0 \\ 0 & 0 \end{pmatrix} & \begin{pmatrix} 0 & 0 \\ 0 & 0 \end{pmatrix} & \begin{pmatrix} 0 & 0 \\ 0 & 0 \end{pmatrix} \\ \begin{pmatrix} 1 & 0 \\ 0 & 1 \end{pmatrix} R_\psi & \begin{pmatrix} 0 & 0 \\ 0 & 0 \end{pmatrix} & \begin{pmatrix} 0 & 0 \\ 0 & 0 \end{pmatrix} & \begin{pmatrix} 0 & 0 \\ 0 & 0 \end{pmatrix} \end{pmatrix}$$

$$B = \begin{pmatrix} \begin{pmatrix} -\sin(\theta) \\ \sin(\phi) \end{pmatrix} \\ \begin{pmatrix} 0 \\ 0 \end{pmatrix} \\ \begin{pmatrix} 0 \\ 0 \end{pmatrix} \\ \begin{pmatrix} 0 \\ 0 \end{pmatrix} \end{pmatrix} \text{ et } U = g$$

$\dot{X}$ representing the evolution of the initial value X of the state vector, the input U of the system being the gravity U=g, $C_x$ and $C_y$ being the aerodynamic friction coefficients of the drone along its u and v axes, m being the mass of the drone, $\phi$, $\theta$ and $\psi$ being the Euler angles (respectively roll, pitch and yaw angles) characterizing the attitude of the drone relative to the coordinate system NED, $\omega_z$ being the rate of rotation about the axis w (yaw rotation movement), and $R_\psi$ being the rotation matrix associated to the angle $\psi$, in dimension 2.

The zero terms of the two sub-matrices A and B of the above relation come from the fact that, by hypothesis, the wind and the bias of the accelerometer are considered as being constant over the short term. It will be noted that this does not prevent the estimation of these states because i) the speed of wind is dynamically coupled to the speed of the drone relative to the ground, itself measured, and ii) the bias of the accelerometer is measured through the acceleration measurement.

Moreover, it will be noted that these two sub-matrices A and B are not constant (which corresponds to a non-stationary Kalman filter), because they depend on the attitude of the drone and of its rotational speed about the yaw axis; but these parameters are supposed to be known by the estimator, insofar as they are in practice measured or estimated within the framework of the control of attitude of the drone.

The observation matrix is:

$$\begin{pmatrix} \begin{pmatrix} Acc_{mes_X} \\ Acc_{mes_Y} \end{pmatrix} \\ \begin{pmatrix} V_{vision_X} \\ V_{vision_Y} \end{pmatrix} \\ \begin{pmatrix} X_{carpet} \\ Y_{carpet} \end{pmatrix} \end{pmatrix} = \begin{pmatrix} \begin{pmatrix} -\frac{C_x}{m} & \omega_Z \\ -\omega_Z & -\frac{C_y}{m} \end{pmatrix} & \begin{pmatrix} \frac{C_x}{m} & 0 \\ 0 & \frac{C_y}{m} \end{pmatrix} R_\psi & \begin{pmatrix} 1 & 0 \\ 0 & 1 \end{pmatrix} & \begin{pmatrix} 0 & 0 \\ 0 & 0 \end{pmatrix} \\ \begin{pmatrix} 1 & 0 \\ 0 & 1 \end{pmatrix} & \begin{pmatrix} 0 & 0 \\ 0 & 0 \end{pmatrix} & \begin{pmatrix} 0 & 0 \\ 0 & 0 \end{pmatrix} & \begin{pmatrix} 0 & 0 \\ 0 & 0 \end{pmatrix} \\ \begin{pmatrix} 1 & 0 \\ 0 & 1 \end{pmatrix} * R_\psi & \begin{pmatrix} 0 & 0 \\ 0 & 0 \end{pmatrix} & \begin{pmatrix} 0 & 0 \\ 0 & 0 \end{pmatrix} & \begin{pmatrix} 0 & 0 \\ 0 & 0 \end{pmatrix} \end{pmatrix} X$$

i.e:

$$C = \begin{pmatrix} \begin{pmatrix} -\frac{C_x}{m} & \omega_Z \\ -\omega_Z & -\frac{C_y}{m} \end{pmatrix} & \begin{pmatrix} \frac{C_x}{m} & 0 \\ 0 & \frac{C_y}{m} \end{pmatrix} R_\psi & \begin{pmatrix} 1 & 0 \\ 0 & 1 \end{pmatrix} & \begin{pmatrix} 0 & 0 \\ 0 & 0 \end{pmatrix} \\ \begin{pmatrix} 1 & 0 \\ 0 & 1 \end{pmatrix} & \begin{pmatrix} 0 & 0 \\ 0 & 0 \end{pmatrix} & \begin{pmatrix} 0 & 0 \\ 0 & 0 \end{pmatrix} & \begin{pmatrix} 0 & 0 \\ 0 & 0 \end{pmatrix} \\ \begin{pmatrix} 1 & 0 \\ 0 & 1 \end{pmatrix} * R_\psi & \begin{pmatrix} 0 & 0 \\ 0 & 0 \end{pmatrix} & \begin{pmatrix} 0 & 0 \\ 0 & 0 \end{pmatrix} & \begin{pmatrix} 0 & 0 \\ 0 & 0 \end{pmatrix} \end{pmatrix}$$

and $D = 0$ $Acc_{mesx}$ and $Acc_{mesy}$ representing the horizontal acceleration measured, $V_{visonX}$ and $V_{visionY}$ representing the horizontal speed measured based on the images picked up by the vertical-view camera, and $X_{carpet}$ and $Y_{carpet}$ representing the horizontal position determined by recognition of specific patterns present in the field of view of the vertical-view camera.

The acceleration is given by:

$$Acc_{mes} = \begin{pmatrix} Acc_{mes_X} \\ Acc_{mes_Y} \\ Acc_{mes_Z} \end{pmatrix} = \begin{pmatrix} B_X \\ B_Y \\ B_Z \end{pmatrix} + \begin{pmatrix} A_{D/S_x} \\ A_{D/S_y} \\ A_{D/S_z} \end{pmatrix}_d - g \cdot R_{\phi,\theta,\psi} \begin{pmatrix} 0 \\ 0 \\ 1 \end{pmatrix}$$

To take into account the fact that an accelerometer measures the non-gravitational forces it undergoes, the acceleration is expressed differently as a function of the state vector:
when the drone flies $$Acc_{mes} = \left( \begin{pmatrix} -\frac{C_x}{m} & \omega_Z \\ -\omega_Z & -\frac{C_y}{m} \end{pmatrix} \begin{pmatrix} \frac{C_x}{m} & 0 \\ 0 & \frac{C_y}{m} \end{pmatrix} R_\psi \begin{pmatrix} 1 & 0 \\ 0 & 1 \end{pmatrix} \right) X + \begin{pmatrix} 0 \\ 0 \end{pmatrix} \cdot U;$$

and, in the same way, when the drone is on the ground (landed):

$$Acc_{mes} = \left( \begin{pmatrix} 0 & 0 \\ 0 & 0 \end{pmatrix} \begin{pmatrix} 0 & 0 \\ 0 & 0 \end{pmatrix} \begin{pmatrix} 1 & 0 \\ 0 & 1 \end{pmatrix} \right) X + \begin{pmatrix} \sin(\theta) \\ -\sin(\phi) \end{pmatrix} \cdot U$$

As regards the speed, the latter is measured in the coordinate system {u,v,w} linked to the drone thanks to the on-board vertical-view camera giving an image of the ground. This image is analyzed by algorithms such as those described in the above-mentioned EP 2 400 460 A1, which estimates the displacement of the scene picked up by the camera in a following image and applies to this estimated displacement a scale factor that is function of the altitude, which is itself estimated by merging the data produced by an ultrasonic telemeter and by a barometer sensor.

The speed of the drone expressed in its coordinate system being an element of the state vector, the writing of the measurement as a function of the state vector is direct:

$$V_{mes} = \left( \begin{pmatrix} 1 & 0 \\ 0 & 1 \end{pmatrix} \begin{pmatrix} 0 & 0 \\ 0 & 0 \end{pmatrix} \begin{pmatrix} 0 & 0 \\ 0 & 0 \end{pmatrix} \right) X + \begin{pmatrix} 0 \\ 0 \end{pmatrix} \cdot U$$

Insofar as, concretely, the estimator that is used works in discrete time (by successive iterations), it is possible to use in practice a discretized version of the dynamic model, by first-order approximation (relation of the type "following state $X_{t+\delta t}$ as a function of the current state $X_t$"):

$$X_{t+\delta t} = X_t + \dot{X}_t \cdot \delta t$$

$$X_{t+\delta t} = X_t + (AX_t + BU) \cdot \delta t$$

Hence:

$$X_{t+\delta t} = A_d X_t + B_d \cdot U$$

With:

$$A_d = Id + A \cdot \delta t$$

$$B_d = \delta t \cdot B$$

Figure 3:
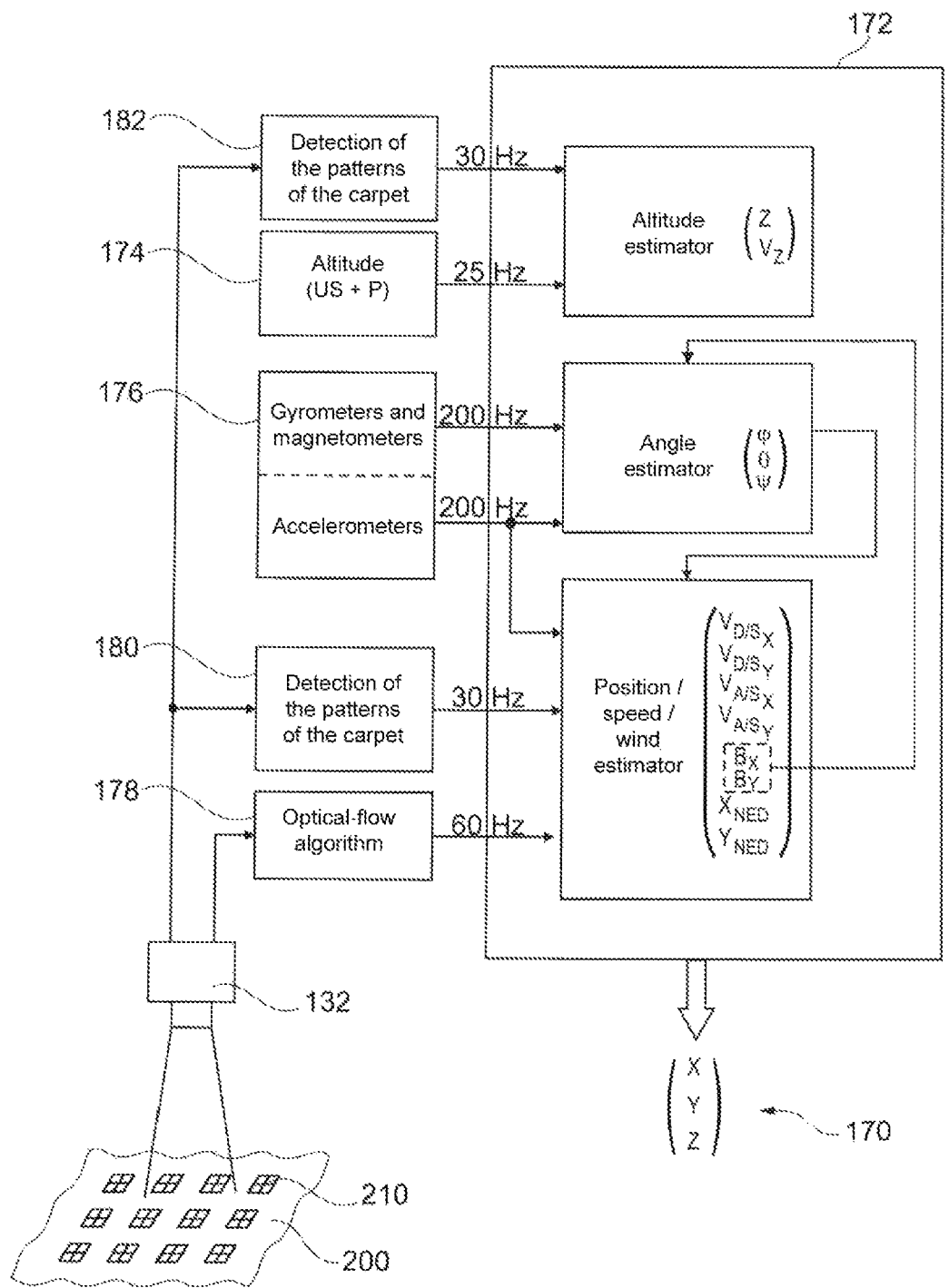
FIG. 3 shows more precisely, in the form of functional blocks, the different elements involved in the navigation system according to the invention.

As regards the estimation of the drone position, FIG. 3 schematizes, in the form of functional blocs, the principle of the technique proposed by the invention.

The matter is to obtain a vector 170 of coordinates {X,Y,Z} by means of an estimator 172 receiving as an input signals coming from different on-board sensors, whose signals are merged together to obtain accurate and robust-to-signal-loss position data. The global estimator 172 is a predictive filter estimator receiving:

an altitude estimation, derived from the signals produced by the ultrasonic and barometer sensors, at a refresh rate of about 20 Hz (block 174);

a linear and angular speed estimation, derived from the signals delivered by the gyrometers 102, the magnetometer 116 and the accelerometers 114, at a refresh rate of about 200 Hz (block 176);

a horizontal speed estimation, obtained by implementation of an optical-flow algorithm based on the successive images delivered by the vertical-view camera 132, at a refresh rate of about 60 Hz (block 178).

Characteristically, the invention also implements the use of a carpet 200 laid on the ground, exhibiting known predetermined patterns 210, present in the scene picked up by the camera 132, each of these patterns being uniquely identified by proper visual characteristics, recognizable on the image picked up by the camera (these patterns and how to detect them will be described in more detail hereinafter with reference to FIG. 4 and following).

An analysis algorithm identifies these patterns and produces an estimation of horizontal position X and Y (block 180) and altitude Z (block 182), at a typical refresh rate of 30 Hz.

More precisely:

the accelerometers-gyrometers-magnetometer unit 176 allows to estimate the attitude of the drone (angles φ, θ, ψ). The accelerometers are used as inclinometers, by the significant bias of these sensors distorts the angle measurement, so that their bias will be evaluated, by means of the camera 132, in the manner described hereafter; the acceleration measured after debiasing of the measurement gives moreover an image of the speed of displacement of the drone, to within a constant vector;

the vertical camera 132 allows, by application of an optical-flow algorithm, to know the speed of displacement of the drone in the plane, after scaling by means of the measurement provided by the ultrasonic sensor, which looks at in the same direction as the camera. This speed is noisy but not biased, which allows by comparison with the speed extracted from the accelerometers (biased but a little noisy) to estimate the bias of the measurement;

the ultrasonic and barometer altitude sensors 174 allows, by merging the two data, to estimate an altitude that is robust to the erroneous measurements, in particular those provided by the ultrasonic sensor in the case of grounds such as grass or bushes;

finally, the identification of the patterns encoding a known position (block 180) provides, based on the image delivered by the camera, an absolute position data in a predefined coordinate system, this data being however itself rather noisy.

The merging of the data delivered by all the sensors allows to obtain the most reliable measurement possible, with the highest refresh rate possible. The accuracy obtained allows in particular to describe accurately the trajectory of the drone in a coordinate system linked to the ground, with an excellent follow up of this trajectory.

Configuration and Identification of the Patterns of the Carpet

The way the patterns 210 of the carpet 200 laid on the ground are picked up by the camera, then detected and analyzed, will now be described, with reference to FIGS. 4 to 11.

The identification of these patterns, made as will be described hereinafter, allows to accurately localize the drone in an autonomous manner in the finite space of the carpet, and this whatever the speed and altitude flight conditions.

In particular, as will be seen, the technique proposed has to allow an almost-certain identification of the patterns, which would be difficult to perform in any circumstances with encoding systems of the two-dimensional barcode type, such as the matrix-code QR or DataMatrix, which are difficult to read when the drone progresses at high altitude, or at low altitude but high speed.

FIG. 4 is a top view of the carpet used by the method of the invention. The background of the carpet is chosen so as to be grey, to avoid the effects of overexposure or underexposure of the image by the auto-exposure algorithm of the camera.

The patterns 210 are for example equidistant squares each consisted of four juxtaposed square sub-patterns 212a to 212d, each of these sub-patterns itself forming an area of predetermined uniform color.

As mentioned hereinabove, each pattern has to be unique, even after rotation over itself, so as to be able to define the yaw angle $\psi$ of the drone relative to the carpet. If it is decided to encode the sub-patterns over five predetermined colors, with four sub-patterns (the square 212a to 212d of the pattern 210), it is hence possible to obtain 150 different patterns.

Figure 6:
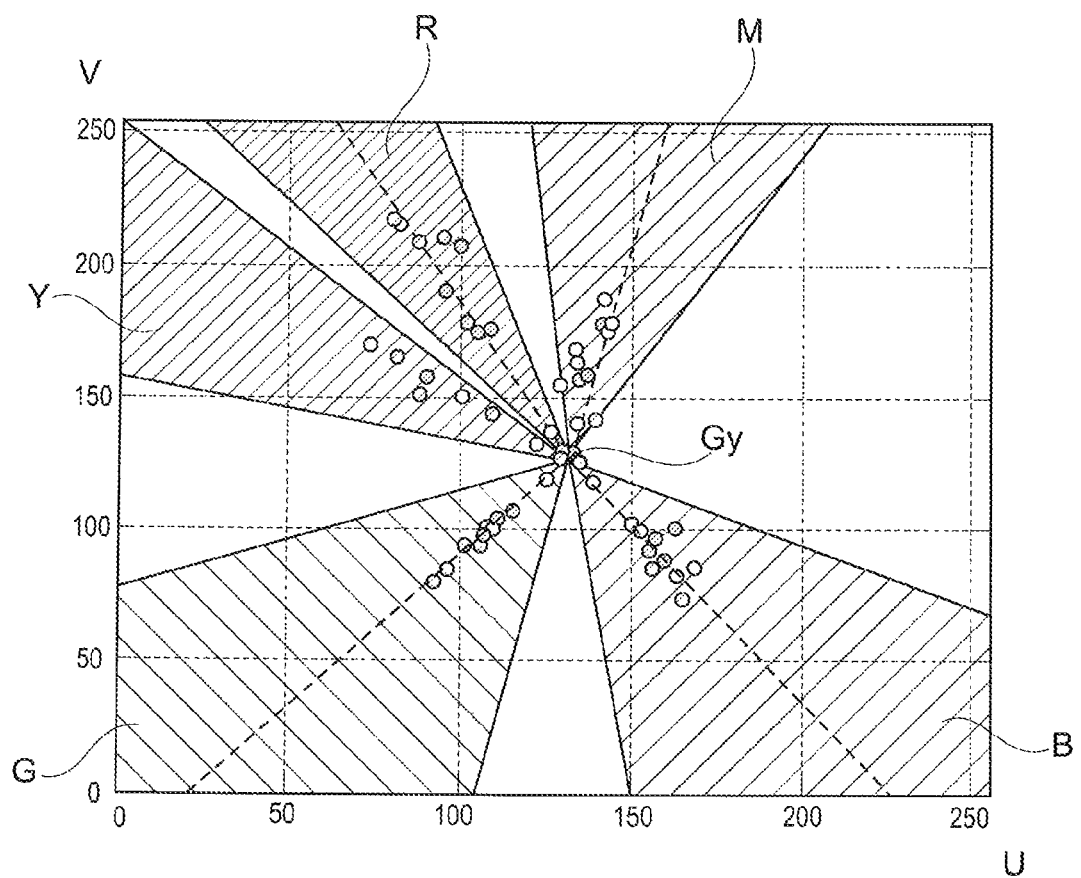
FIG. 6 is a representation of the colorimetric space $\{U,V\}$, indicating the sectors corresponding to each of the colors chosen to identify and discriminate the patterns of the carpet.

These five colors have besides to be the most different possible relative to each other, so as to be able to differentiate them easily whatever the brightness conditions and the type of lighting used, because they are rendered in a substantially different manner by the camera according to these conditions. Tests have been performed, corresponding to the points plotted in the colorimetric space {U,V} of FIG. 6: colorimetric domains have been defined after linear regression for each color, these domains being in the form of sectors radiating from the point G corresponding to the neutral grey. In FIG. 6, five sectors are hence defined: red R, magenta M, blue B, green G and yellow Y, allowing to optimize the extraction of the colors and the recognition of the patterns, independently of brightness changes. The neutral grey corresponding to the point G is a grey 128, the colors being encoded in U and V from 0 to 255.

The algorithm for detecting the patterns in the image picked up by the camera and identifying these patterns by extraction of the color codes will now be explained.

Figure 5:
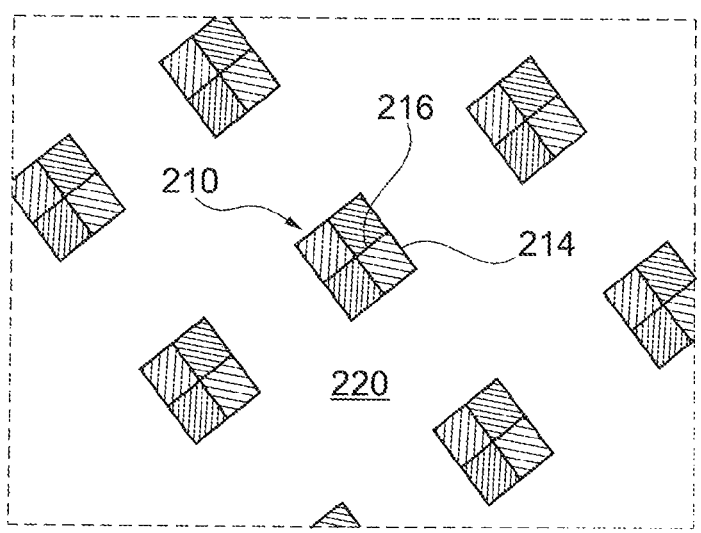
FIG. 5 illustrates an example of image picked up by the front view camera of the drone, with a number of patterns present in the field of view of this camera.

FIG. 5 illustrates an example of image picked up by the front-view camera of the drone, with a number of patterns present in the field of view of this camera.

The algorithm is executed for each image delivered by the vertical-view camera, with a recurrence rate of 30 Hz.

Firstly, a pre-filtering is applied to the totality of the image, so as to work efficiently in the color space.

To that end, the distance $L_1$ of each pixel, in the colorimetric space {U,V}, with respect to the point G {128, 128} corresponding to the mean grey of the carpet background, is calculated. A threshold is applied to this distance to reduce the disparities inside a pattern.

The following step consists in applying to the resulting image a filtering for the detection of contours, for example of the Sobel filtering type, which is an operator currently used in image processing, with calculation of the intensity gradient of each pixel to recognize the points of abrupt change of brightness, probably corresponding to edges, as well as the orientation of these edges.

The Sobel filtering allows, in the present case, to obtain an image of the absolute value of the norm $L_1$ of the gradients, to which is applied a threshold, hence providing an image from which will have been extracted the pixels corresponding to the edges 214 of the various patterns. This processing has however for effect to also extract inside the pattern some of the boundaries 216 between colored sub-patterns, due to the blur generated by the camera, which creates at these boundaries variations of color producing spurious pixels that will have to be eliminated.

In addition to the pattern contours, the Sobel filtering also gives an image of the gradient orientations, i.e. the directions of the intensity changes.

Figure 7:
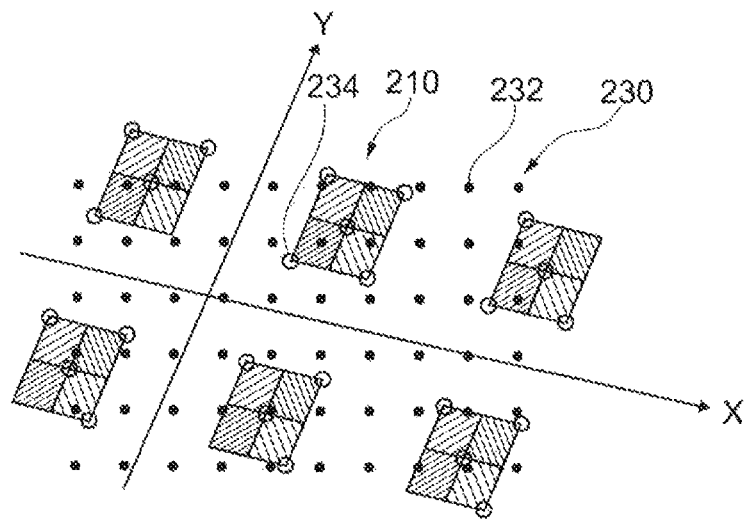
FIG. 7 illustrates the phase of search for the patterns by a technique of point of impact.

The following step, illustrated by FIG. 7, is a step of search for the patterns by points of impact, by means of an array 230 of a plurality of points 232 superimposed to the image produced by the camera.

The matter is to search in the image for the pixels considered as "colored", i.e. which do not belong to the grey background, that is to say the pixels located inside a pattern with a contour such as previously detected. If the impacted pixel is not considered as "colored", the algorithm goes to a following impact, obtained by incrementing the analysis pitch by the estimated size of the pattern.

The estimated pattern size may be derived from the size of the patterns recognized and analyzed at the preceding image (previous iteration of the algorithm). Indeed, insofar as the acquisition is performed at a rate of the order of 30 Hz, the movement is small between two images and this approximation is generally sufficient. In the case where the estimated pattern size is unknown (beginning of detection, loss of detection since several images . . . ), the processing is performed based on successive decreasing estimated sizes. If geometrical and consistency constraints are applied, it is easy to detect the case where the estimated size is not the correct one, and in practice, the convergence of the size estimation is of the order of only four to five iterations.

After analysis of all the impacts, the patterns seen entirely on the image picked up by the camera are reached by the points of impact, schematized by the circles 234 of FIG. 7.

To avoid detecting color points outside the carpet (when the drone progresses near this edge), an additional verification is operated, consisting in verifying that the points located in the four directions at a distance of $\sqrt{2}$ times the estimated size of the pattern are grey patterns: hence, points of color located outside the carpet will trigger no processing. The following step consists in extracting the corners of the patterns for which a point of impact has been detected.

Figure 8:
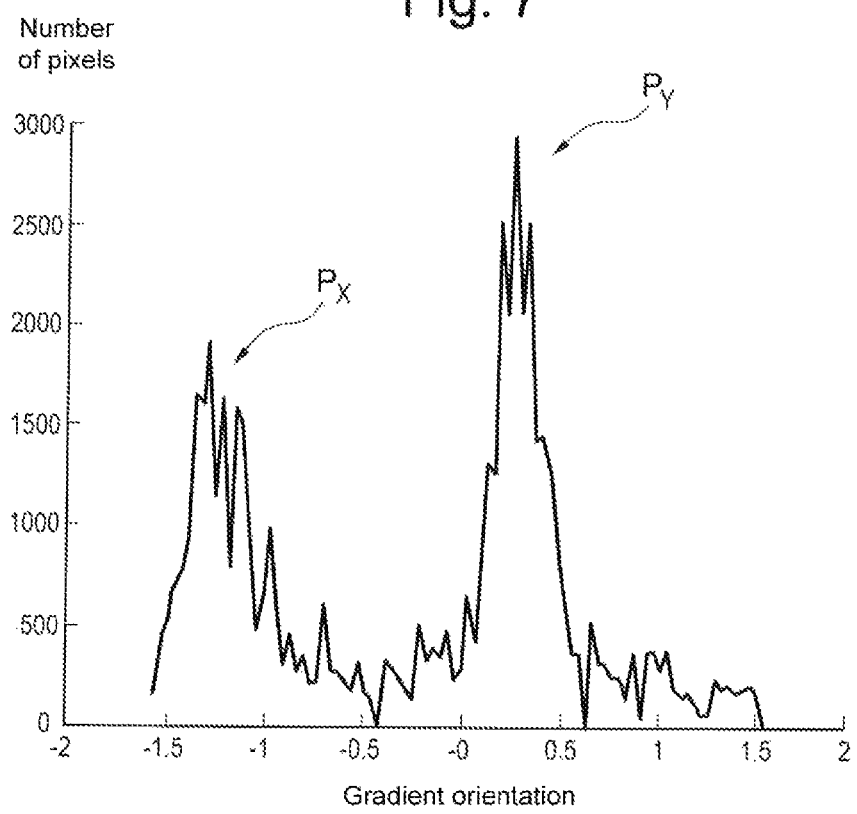
FIG. 8 is an histogram of the orientation of the gradients for the pixels of the edges corresponding to a pattern recognized in the image.

Once this point of impact has been detected, a window located around this point is considered, of which it is certain that it contains entirely the concerned pattern, and only this pattern. FIG. 8 shows the histogram of the gradient orientations for the pixels of the edges in this window, which exhibit two peaks $P_X$ and $P_Y$, corresponding to the two directions X and Y of the axes of the square consisted by each of the patterns 210.

These two orientations X and Y may be extracted by a detection of maximum in this histogram, associated with the constraint that the sum of the orientation has to be equal to 90° (because the patterns are square).

Figure 9:
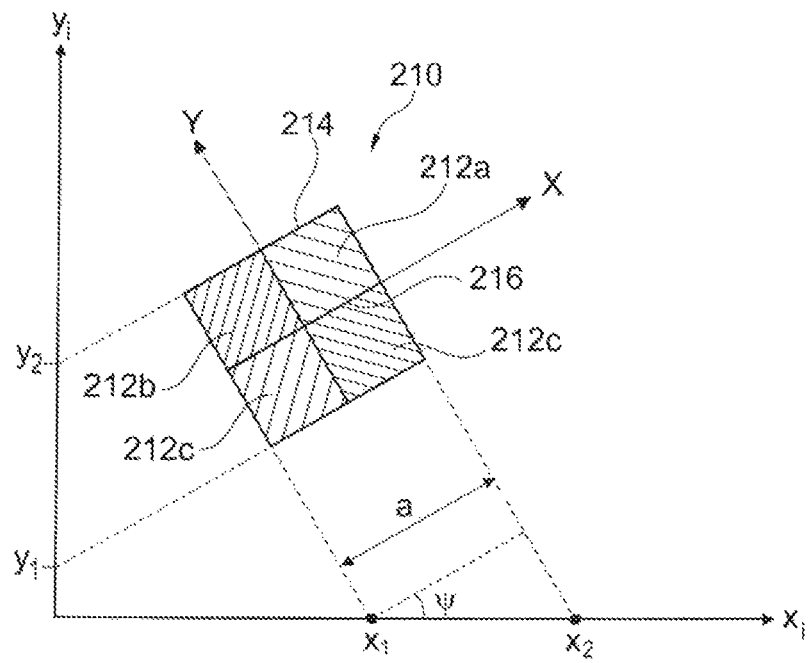
FIG. 9 illustrates the position of the pattern and the orientation thereof in the image picked up by the camera, with the different parameters used for the detection and the identification of this pattern.

FIG. 9 illustrates more precisely the position of the pattern and its orientation in the image picked up by the camera, with the different parameters that will be used for the detection and the identification of this pattern.

The orientation of the square in the image having been determined (axes X and Y), it is advisable to determine the ordinate at the origin $y_i$ of each of the straight lines corresponding to each segment of the square, as illustrated in FIG. 9.

For that purpose, the algorithm scans all the possible values of ordinate at the origin $y_i$, by incrementing a counter each times a point of the edge belongs to the thus-formed straight line.

Figure 10:
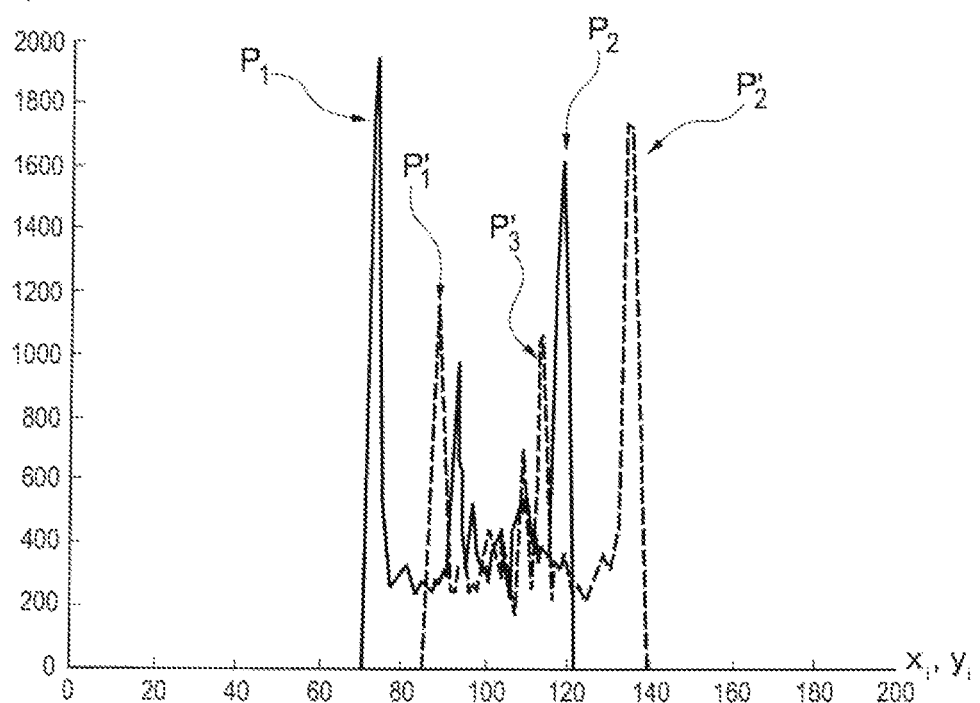
FIG. 10 is an histogram illustrating the result of the analysis of the pattern of FIG. 9, for the two detected orientations of the sides of the square.
Figure 11:
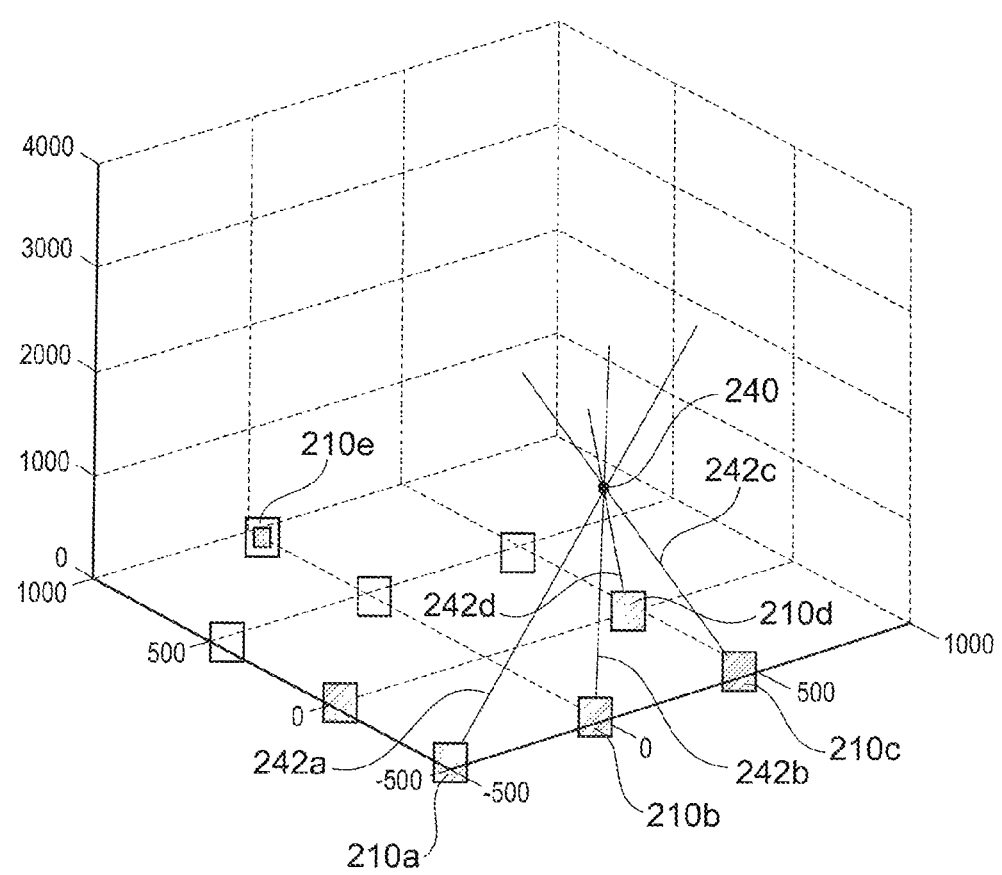
FIG. 11 illustrates the way to determine the position of the drone as a function of the average distance at each of a plurality of patterns recognized and identified in the field of the camera.

FIG. 10 illustrates an example of algorithm obtained at the end of this scanning, for each of the two orientations (in full line and dash line, respectively).

For each of the two orientations, the histogram has two main peaks, $P_1$, $P_2$ and $P'_1$, $P'_2$, respectively, corresponding to the contours of the pattern 210. A spurious peak such as $P'_3$ may however be present, corresponding to the boundary 216 separating the colors inside the pattern. In practice, the spurious peaks have sometimes a higher value than the main peaks (which are to be detected). To eliminate them, the algorithm must operate the search for the maxima for detecting the peaks by imposing the verification of constraints such that:

insofar as the pattern is a square, the distance between the two ordinates at the origin corresponding to an orientation $(Y_2-Y_1)$ must be equal to that of the other orientation $(X_2-X_1)$; and this distance has to be close to the estimated size a of the pattern, to within a trigonometric equation.

These constraints may be summed up by: $Y_2-Y_1=X_2-X_1=a/\cos \psi$.

The straight lines corresponding to the boundaries 216 between the colors are hence eliminated, the algorithm then giving only the four straight lines passing by each of the sides 214 of the pattern. By solving the equations of intersection of these straight lines, the positions of the four corners of the square pattern 210 may be easily determined, as well as those of the corners of the sub-patterns corresponding to each of the four colored areas.

Once determined the corners of each sub-pattern (color square), the algorithm calculates the average value of the colorimetric components U and V of the pixels present inside the corresponding trapezium. This average value is then positioned in the predefined colorimetric space $\{U,V\}$ (FIG. 6), so as to decide what is the color of the sub-pattern.

The analysis is reiterated for each of the sub-patterns, which gives the list of the four colors of the pattern uniquely identifying the latter. These four colors are compared to a list of files kept in memory, and a correlation table provides the two coordinates of horizontal position X and Y on the carpet of each pattern detected in the image picked up by the camera.

The final step consists, based on the positions in X and in Y of each of the detected patterns, in determining the position coordinates of the drone in the coordinate system NED of the carpet, in the three dimensions X, Y and Z.

In the first case (single-detection), a single pattern has been detected and identified in the image collected by the camera. This situation typically corresponds to an overflight of the carpet at low altitude, hence close to the pattern. It is possible to calculate the equation of a straight line on which is located the drone, based on the position of the pattern on the carpet and the orientation of the drone, known thanks to the inertial unit. The algorithm then calculates the distance between the drone and the pattern, determined based on the size of the pattern on the picked-up image (determined by the analysis of this image), on its real size (known a priori) as well as on the focal distance of the camera. This method provides a good accuracy, because this is a situation where the drone is at low altitude, hence close to the pattern: the pixel size of the pattern varying as the inverse of the distance, the error is of the order of the pixel. In a second case (multi-detection), illustrated in FIG. 11, the drone has detected and identified several patterns in the image picked up by the camera, which corresponds to a situation of flight at higher altitude. A first step consists in verifying the consistency between these different patterns, by operating a filtering on the size, the orientation and the position of the patterns on the carpet, to eliminate the inconsistent detections, for example a pattern that seems inconsistent in the image given the position of the others. If more than two patterns pass these tests, the algorithm evaluates the position of the drone by calculating the point 240 (FIG. 11) that minimizes the sum of the squares of the distances of each of the patterns 210a, 210b, 210c and 210d. This calculation is the resolution of a linear system and the average distance at each straight line gives an estimation of the position of the drone. In the example illustrated in FIG. 11, the drone has detected five patterns 210a to 210e, but the detection of the pattern 210e has been rejected because its position relative to the other detections 210a to 210d is not consistent.

The invention claimed is:

1. A rotary-wing drone (10) with multiple rotors (12) driven by respective motors selectively controlled by application of differentiated motor commands to pilot the drone in altitude and speed, comprising:

plurality of sensors adapted to deliver respective drone-state signals, such sensors comprising:

vertical-view camera (16, 132) pointing downward, adapted to pick up images of a scene of the ground (20) overflown by the drone and used to produce a horizontal speed signal, derived from an analysis of the displacement of the picked-up scene from one image to the following;

gyrometer (102), magnetometer (116) and accelerometer (114) sensors, adapted to deliver linear and rotational acceleration signals; and an altimeter (22, 152-158), adapted to deliver a signal of drone altitude relative to the overflown ground; and a predictive-filter estimator incorporating a representation of a dynamic model of the drone, this filter being adapted to perform a prediction of at least one state value of the drone based on the motor commands and to periodically readjust this prediction as a function of the signals delivered by the sensors, wherein the drone further comprises navigation means adapted to determine position coordinates of the drone in an absolute coordinate system (NED) linked to the ground, and in that these navigation means:

are autonomous means adapted to operate without reception of signals external to the drone;

comprise image analysis means (160), adapted to derive a position signal from an analysis of known predetermined patterns (210), present in the scene picked up by the camera, wherein the image analysis means configured to analyze the known predetermined patterns, present in the scene picked up by the camera comprise:

prefiltering means, adapted to extract from the image delivered by the camera the pixels corresponding to the edges of the patterns (210) and of sub-patterns (212a-212d), and to deliver the position thereof and the orientation of the contour (214, 216) of each pattern and sub-pattern;

colorimetric means, adapted to determine the proper color of each sub-pattern;

recognition means, adapted to identify each pattern based on the proper colors of each of the its sub-patterns; and position determination means, adapted to determine the position coordinates ($X_{NED}$, $Y_{NED}$, $Z_{NED}$) of the drone in the absolute coordinate system (NED) linked to the ground as a function of the patterns identified by the recognition means;

implement the predictive-filter estimator (172) at the input of which are applied: the position signal; the horizontal speed signal; the linear and rotational acceleration signals; and the altitude signal.

2. The drone of claim 1, wherein the predictive-filter estimator (172) is an eight-state filter, these states comprising:

two horizontal components ($V_{D/S_X}$, $V_{D/S_Y}$) of the speed of displacement of the drone relative to the ground, expressed in a coordinate system (u,v,w) linked to the drone;

two horizontal components ($V_{A/S_X}$, $V_{A/S_Y}$) of the speed of air relative to the ground, expressed in the absolute coordinate system (NED) linked to the ground;

two horizontal components ($B_X$, $B_Y$) of the drone accelerometer bias; and two horizontal coordinates ($X_{NED}$, $Y_{NED}$) of the drone position in the absolute coordinate system (NED) linked to the drone.

3. The drone of claim 2, wherein the predictive-filter estimator (172) is a Kalman predictive filter.

4. The drone of claim 1, wherein the altimeter also comprises a predictive-filter estimator, adapted to operate a prediction of altitude of the drone and to periodically readjust this prediction as a function of:

the signals delivered by at least one between a telemeter sensor (154) and a barometer sensor (156); and a vertical coordinate signal ($Z_{NED}$) of the drone position, derived from said analysis of the known predetermined patterns (210) present in the scene picked up by the camera.

5. The drone of claim 1, wherein the position determination means are means adapted to evaluate a distance between the drone and a pattern as a function i) of the size of the pattern in the image picked up by the camera, ii) of the known real size of the pattern and iii) of the geometric characteristics of the optical system of the camera.

6. The drone of claim 1, wherein the position determination means are means adapted to evaluate a distance between the drone and a plurality of patterns (210a-210d) by i) determining for each pattern a straight line (242a-242d) linking each pattern to the drone and ii) determining the position by applying to these straight lines a least-square minimization algorithm.

7. A unit comprising:

a rotary-wing drone (10) with multiple rotors (12) driven by respective motors selectively controlled by application of differentiated motor commands to pilot the drone in altitude and speed, comprising:

plurality of sensors adapted to deliver respective drone-state signals, such sensors comprising:

vertical-view camera (16, 132) pointing downward, adapted to pick up images of a scene of the ground (20) overflown by the drone and used to produce a horizontal speed signal, derived from an analysis of the displacement of the picked-up scene from one image to the following;

gyrometer (102), magnetometer (116) and accelerometer (114) sensors, adapted to deliver linear and rotational acceleration signals; and an altimeter (22, 152-158), adapted to deliver a signal of drone altitude relative to the overflown ground; and a predictive-filter estimator incorporating a representation of a dynamic model of the drone, this filter being adapted to perform a prediction of at least one state value of the drone based on the motor commands and to periodically readjust this prediction as a function of the signals delivered by the sensors, wherein the drone further comprises navigation means adapted to determine position coordinates of the drone in an absolute coordinate system (NED) linked to the ground, and in that these navigation means:

are autonomous means adapted to operate without reception of signals external to the drone;

comprise image analysis means (160), adapted to derive a position signal from an analysis of known predetermined patterns (210), present in the scene picked up by the camera;

implement the predictive-filter estimator (172) at the input of which are applied: the position signal; the horizontal speed signal; the linear and rotational acceleration signals; and the altitude signal, and a carpet (200) carrying an array of said predetermined patterns (210), each of these patterns being uniquely identified by proper visual characteristics.

8. The unit of claim 7, wherein said proper visual characteristics comprise for each of the patterns a plurality of colored sub-patterns (212a-212d), the color of each sub-pattern being chosen in a predetermined series of colors (R, G, B, Y, M), and the colors of the sub-patterns of a same pattern being uniquely chosen, and invariant by rotation, for all the patterns of the carpet.

9. The unit of claim 7, wherein the predictive-filter estimator (172) is an eight-state filter, these states comprising:

two horizontal components ($V_{D/S_X}$, $V_{D/S_Y}$) of the speed of displacement of the drone relative to the ground, expressed in a coordinate system (u,v,w) linked to the drone;

two horizontal components ($V_{A/S_X}$, $V_{A/S_Y}$) of the speed of air relative to the ground, expressed in the absolute coordinate system (NED) linked to the ground;

two horizontal components ($B_X$, $B_Y$) of the drone accelerometer bias; and two horizontal coordinates ($X_{NED}$, $Y_{NED}$) of the drone position in the absolute coordinate system (NED) linked to the drone.

10. The unit of claim 9, wherein the predictive-filter estimator (172) is a Kalman predictive filter.

11. The unit of claim 7, wherein the altimeter also comprises a predictive-filter estimator, adapted to operate a prediction of altitude of the drone and to periodically readjust this prediction as a function of:

the signals delivered by at least one between a telemeter sensor (154) and a barometer sensor (156); and a vertical coordinate signal ($Z_{NED}$) of the drone position, derived from said analysis of the known predetermined patterns (210) present in the scene picked up by the camera.

12. The unit of claim 7, wherein the image analysis means configured to analyze the known predetermined patterns, present in the scene picked up by the camera comprise:

prefiltering means, adapted to extract from the image delivered by the camera the pixels corresponding to the edges of the patterns (210) and of sub-patterns (212a-212d), and to deliver the position thereof and the orientation of the contour (214, 216) of each pattern and sub-pattern;

colorimetric means, adapted to determine the proper color of each sub-pattern;

recognition means, adapted to identify each pattern based on the proper colors of each of the its sub-patterns; and position determination means, adapted to determine the position coordinates ($X_{NED}$, $Y_{NED}$, $Z_{NED}$) of the drone in the absolute coordinate system (NED) linked to the ground as a function of the patterns identified by the recognition means.

13. The unit of claim 12, wherein the position determination means are means adapted to evaluate a distance between the drone and a pattern as a function i) of the size of the pattern in the image picked up by the camera, ii) of the known real size of the pattern and iii) of the geometric characteristics of the optical system of the camera.

14. The unit of claim 12, wherein the position determination means are means adapted to evaluate a distance between the drone and a plurality of patterns (210a-210d) by i) determining for each pattern a straight line (242a-242d) linking each pattern to the drone and ii) determining the position by applying to these straight lines a least-square minimization algorithm.

\* \* \* \* \*